Patented Mar. 31, 1936

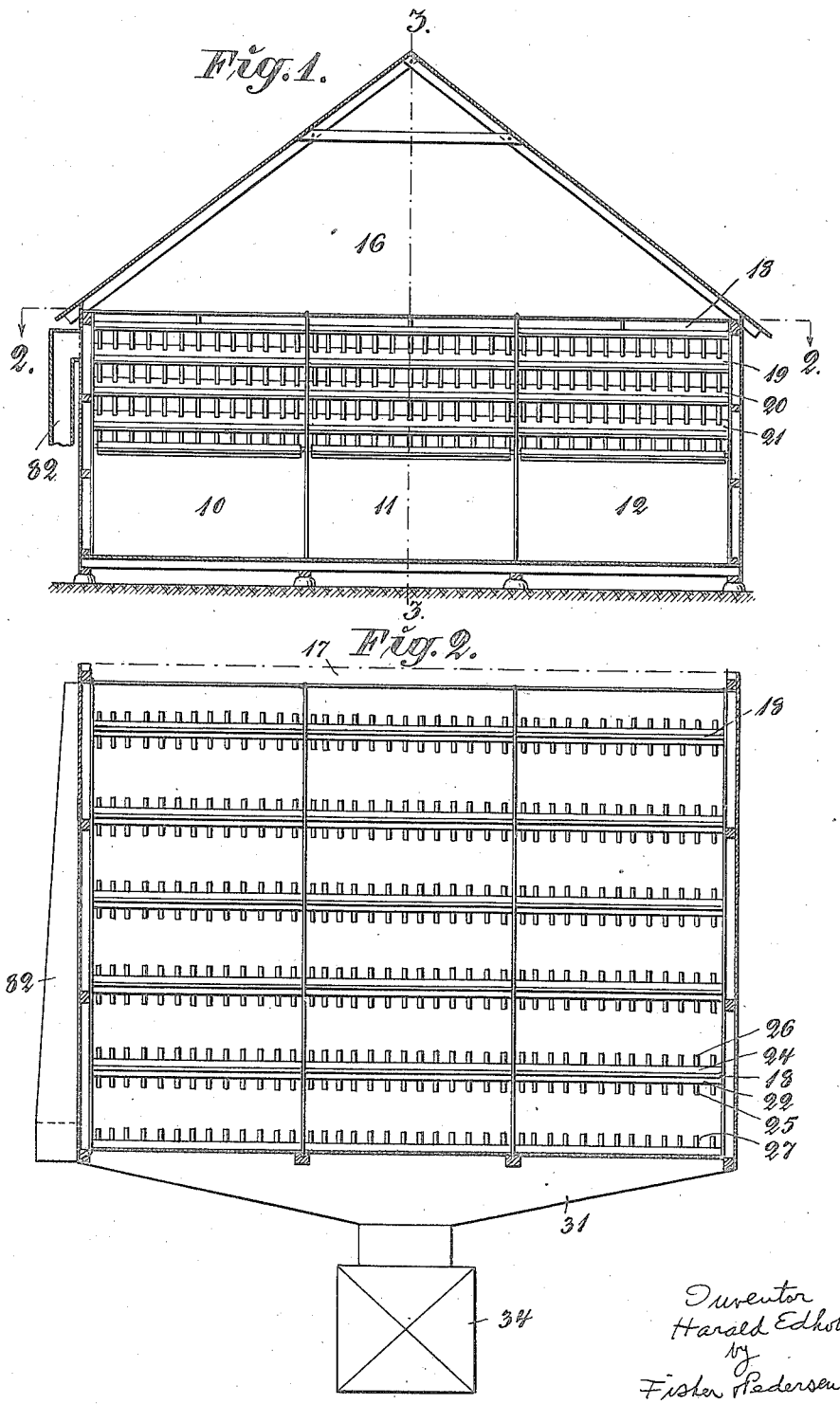

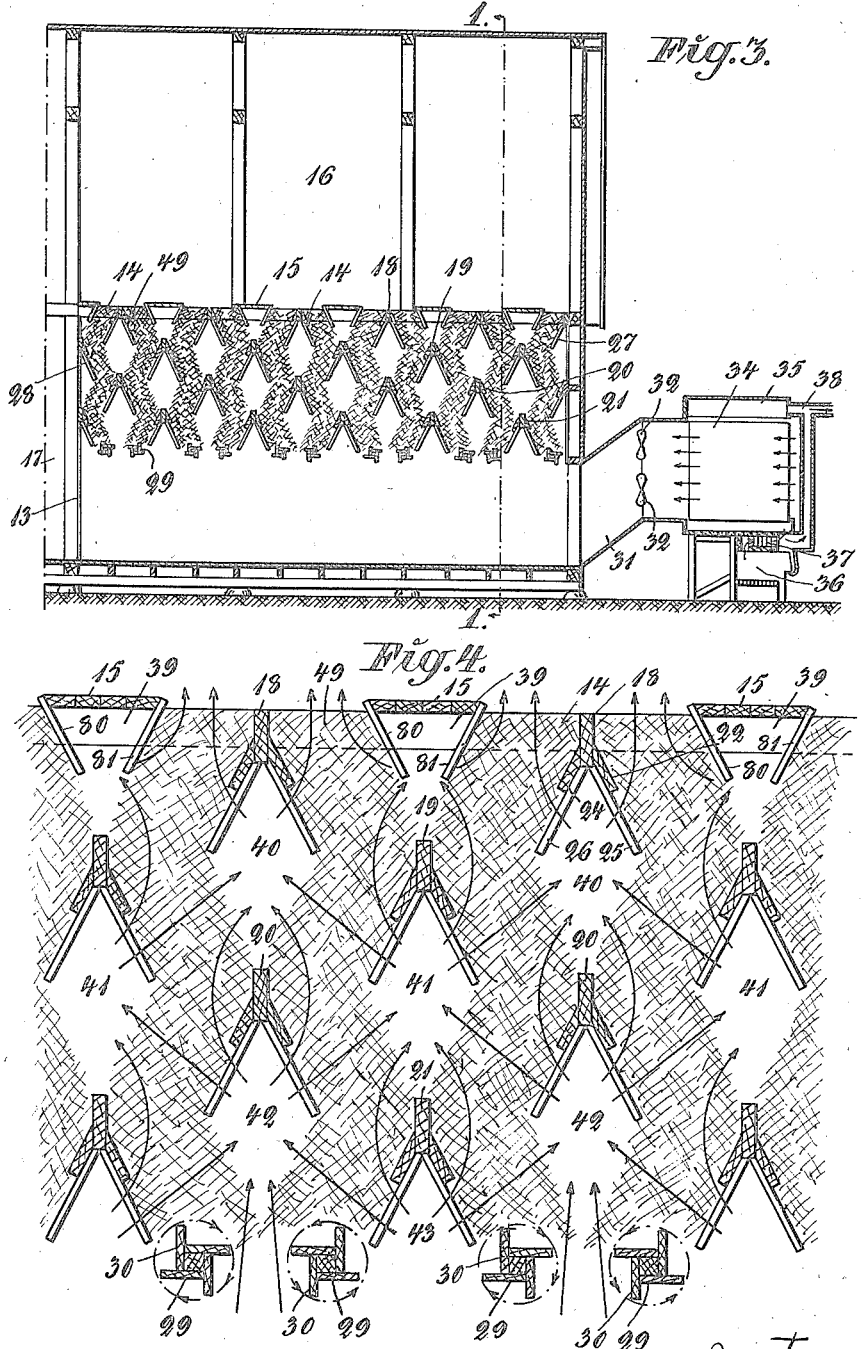

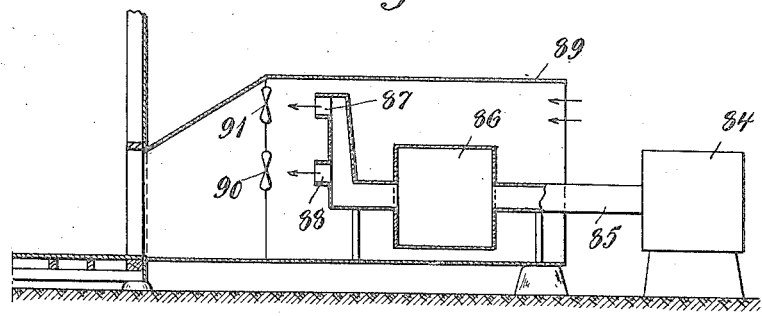
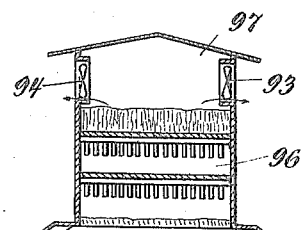
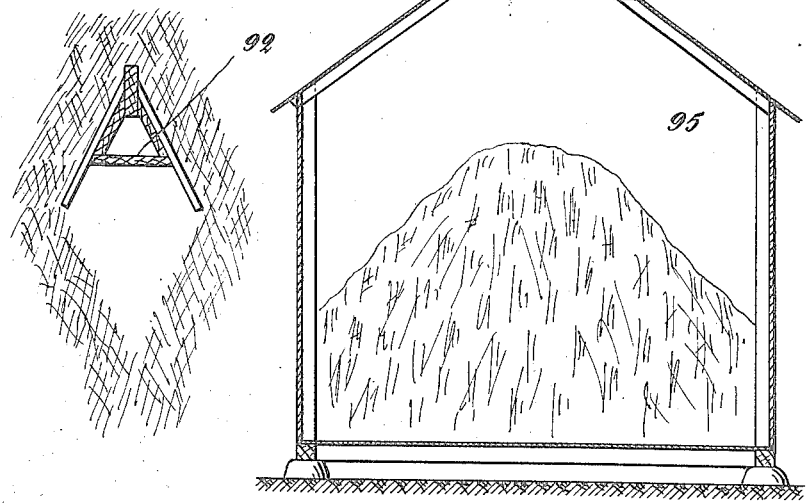

2,036,127

UNITED STATES PATENT OFFICE 2,036,127

DRYING AND/OR STORING OF VEGETABLE MATERIAL

Harald Edholm, Solsidan, Sweden, assignor to Aktiebolaget Svenska Fläktfabriken, Stockholm, Sweden, a company of Sweden Application November 25, 1933, Serial No. 699,781
In Sweden September 26, 1932

14 Claims. (Cl. 34—34)

The present invention relates to a method of drying and/or storing moist vegetable material, particularly living plants, such as grass and herbs, and parts of plants, for example leaves, stem parts, fruits, seeds and root parts, by means of air flowing therethrough. The invention is particularly applicable to vegetable material of a fibrous nature containing a comparatively large proportion of water, for example more than 40 per cent of water based on the total weight. The invention also relates to an arrangement for effecting the drying.

One object of the invention is to render possible, at a minimum of cost, the reduction of the moisture content to such a value below 40 per cent, usually 10 to 15 per cent, that the plant is preserved, and in such a manner that no appreciable decomposition of the digestible constituents of the plant can take place during the drying process.

It has been found in practice that in drying, for instance, grass according to the invention the dried product may be caused to maintain the same nutritive power and the same green color as the living grass.

According to the invention the material is divided into a plurality of individual coherent strings of material sliding down along stationary arrangements adapted for the distribution of the material and/or the air so as to cause the air flowing through the material to meet a comparatively low resistance.

The invention will be more closely described with reference to the accompanying drawings, in which Figure 1 is a cross section through a drying arrangement on the line 1—1 in Figure 3, Figure 2 is a horizontal section on the line 2—2 in Figure 1, Figure 3 is a longitudinal section on the line 3—3 in Figure 1, Figure 4 is a detail showing the arrangement of the beams, Figure 5 is a longitudinal section through another embodiment of the heating arrangement, Figure 6 is a detail, Figure 7 shows diagrammatically another embodiment of the drying chamber.

In the embodiment shown in Figure 1 the plant consists of three sections 10, 11, 12 each comprising a substantially closed chamber 13 the upper wall of which is provided with openings or slots 14 confined by spaced transverse walking planks 15. Above said three sections there is provided a common chamber 16 for the storing of the grass or other material before drying. The material can be brought into said chamber from a cart passage 17 which may be provided with a suitable hoisting or other conveying arrangement, not shown. Each chamber 13 is provided with a number of transverse beams 18, 19, 20, 21 arranged in four stories in such a manner that the beams of a certain story occupy positions in the interspace between the beams in the stories immediately above and below. The construction of the beams can be seen from Figure 4. The beam 18, for example, is provided with two longitudinal downwardly sloping flanges 22, 24 to which a great number of pegs 25 and 26 respectively are secured in such a manner that in cross section the beam assumes the form of an inverted Y. For the purpose of obtaining complete uniformity there are in certain stories arranged further groups of pegs 27 and 28 respectively on the cross walls. The slope of said pegs can preferably be determined with regard to the sliding resistance of the material to be dried. In order to force the material against the wall of the drying room and thus to prevent flow of air between the material and the wall the pegs positioned nearest to the ends of the beams are preferably arranged with a steeper slope than the rest.

At least at the upper part of each material feeding path guide ledges 80, 81 may preferably be provided on the upper side of the path for the purpose of securing a uniform distribution of the material longitudinally of said feeding path, it being possible in this manner effectively to prevent stoppages during the downsliding movement of the string of material.

On account of the fact that the path of the material during its downsliding movement is constantly changed, first in one direction and then in the other, a repeated displacement of the different parts of material in relation to each other is effected. The sliding paths can preferably be so arranged that the string of material becomes thinner in its upper part than in its lower part. This arrangement does not involve any increased air resistance in the lower part because of the fact that there is a reduction in specific air resistance as the drying proceeds.

At the bottom there are arranged a plurality of feeding rollers 29 consisting, according to Figure 4, of a square rotatable shaft preferably made of wood and of four wings 30 secured thereto. One end of each chamber 13 communicates with an inlet duct 31 for the drying air. The latter is forced into the duct preferably by means of so-called propeller fans 32, 33 driven by means of an electric motor or the like. In front of the fans there is arranged an air preheater 34 provided with an outer housing 35. The air preheater is arranged to be heated when desired from a furnace 36, the flames from said furnace being forced to pass a so-called combustion accelerator 37. From the combustion accelerator the hot combustion gases flow through the air preheater 34 and out through the outlet pipe 38. The combustion gases may of course also be passed through the drying apparatus diluted with cold air after the gas has been freed from sparks, soot and the like in a manner known per se, for instance according to Figure 5 where the outlet pipe 85 of the furnace 84 is carried through a separator 86 to mixing orifices 87, 88. Fresh air enters directly into the drum 89 and is sucked together with the purified gases from the orifices 87, 88 into the drying room by means of the fans 90, 91.

When the arrangement is to be used the material 49 to be dried, for instance hay or grass, is filled into the openings 14 from where it falls down and forms zig-zag-shaped strings between the beam arrangements 18, 19, 20 and 21 and is finally stopped by the appertaining feeding means 29. As is clearly seen in Figure 4 air mixing spaces 39, 40, 41, 42 and 43 are then formed right through the material.

The purpose of said air spaces is to divide the material to be dried into a number of comparatively thin layers which are mutually connected in series in relation to the air current. If it were assumed that the air were instead forced to pass through a single thick layer it would select certain paths through the material and entirely pass by certain portions of the material which consequently would become unevenly dried. Nor would in this case the heat absorbing capacity of the air be utilized to a sufficient degree. Through the division in comparatively thin layers proposed above a more even distribution of the air within each layer is obtained. In addition, the air is better utilized as a volume of air possibly passing through an opening in the layer would be forced to mix with the other volumes of air flowing into the same air space and would thereafter be utilized for the drying in the next layer.

The mixing space 40 must not necessarily, as on the drawings, consist of the entire space enclosed within the stationary parts 25, 26, 20 but may also constitute only part thereof, for example according to Figure 6 where the mixing space is limited at the top by the wall 92.

When the fans 32 and 33 are started a certain excess pressure is created at the lower part of the room 13 whereby air currents are set up through the material to be dried which air currents pass according to the arrows in Figure 4 from all the spaces 43 over to the air channels 42 and 41 and then further to the air channels 40 and 39 and out through the openings 14 to the room 16 where atmospheric pressure prevails. As will be clear from the figure the material will be thoroughly passed by drying air according to the counter-current principle, and in moist weather the temperature of the incoming drying air can be increased somewhat by making a fire in the furnace 36.

In order to prevent decomposition of the digestible constituents of the plant it is of importance that its different parts get their water content lowered as soon as possible, at least at their surface layers, so that the plant is forced into a changed vital action. Under certain conditions even a synthesis of albumen may then take place, probably on account of a rapid increase of the cell juice concentration at the beginning of the drying process. Although it is economically advantageous to employ the counter-current principle mentioned above, according to which the wettest part of the material to be dried is met by the wettest part of the drying air it may, at least during a certain period of time after the laying-in of the fodder, be preferable to subject the wet material to be dried to an air current that is sufficiently dry to force the plant to alter its vital action as mentioned above.

This may be accomplished in the shown embodiment by introducing, during a short period at the beginning of the drying, a volume of dry air directly to the channels 39 and 40 in Figure 4, for example through a special duct 82 in Figures 1 and 2, or to reduce through an extra temporary heating the relative humidity of the air flowing in normal manner therethrough, or the volume of air flowing through the fodder may be temporarily increased so that even when reaching the newly put-in material to be dried the air still retains a considerable part of its drying capacity.

After the rapid drying has caused a reduction of the water content in the outer parts of the plant this condition may easily be maintained even at a higher degree of saturation of the air and the counter-current principle may thereafter be applied for the drying.

In case store rooms are desired during drying it may be preferable to arrange the fans 93, 94, Figure 7, on the suction side, i. e. above the down-sliding fodder mass. The room 95 must then not any longer be closed to the surroundings and the material can be allowed to fall directly down into said room, if desired for storage. The drying apparatus 96 proper may then preferably be housed in a lantern-tower 97 on the roof of the building.

It has been found in practice that when drying according to the invention the air current must be so powerful that the water content is reduced to 40 per cent within five or six days in order that decomposition shall be kept within allowable limits.

It has also been found that even if the plant is subjected to drying during several days in atmospheric and even rather moist air the decomposition is limited to moderate values on account of the fodder being prevented from assuming the temperature required for a rapid decomposition. In other words, the fodder may be preserved for some time through flowing air. When the atmospheric air is comparatively dry the preserving effect will be further increased on account of the fodder assuming, during drying, a considerably lower temperature than the air, decomposition decreasing considerably with the temperature. Thus, at 10 degrees centigrade decomposition takes place exceedingly slowly.

At the beginning of the drying process the flow of air must not be interrupted for more than a few hours when young vegetable plants are being dried as otherwise decomposition would start. When it is a question of older plants which do not assume high temperatures so rapidly, and also during the later stages of the drying process, the interruptions may be increased to about 12 hours. The main thing is, however, that the interruptions are not made so long that the fodder on account of its own vital action or of that of the bacteria assumes a considerably higher temperature. In other words, the air current should be substantially continuous.

As an example it may be assumed that the apparatus is built for receiving 30,000 kilograms of wet material. In the same is placed each day, in one or more stages, a total of 8,000 kilograms of material. During the day, for example during 8 hours, the air current can be assumed to have a temperature of 15 degrees centigrade and a relative humidity of 40 per cent, drying being then preferably effected with natural air which, however, under urgent conditions may be heated for example to 35 degrees centigrade, the relative humidity of the air entering the drier then decreasing to 12 per cent. Heating is, however, disadvantageous from an economical point of view and it will generally be found cheaper to use only natural air when it has the degree of dryness assumed above.

In the mornings and in the evenings the humidity of the air is greater, for example 60 to 70 per cent during altogether 8 hours. When a small turning-out capacity is required cold air may in many cases be used. In other cases a certain heating may, however, be found suitable or necessary with regard to the output desired.

During the night, for about 8 hours, the humidity can be assumed to be about 90 per cent. It is then generally preferable to heat the air in order to facilitate the drying. At a small production it may, however, be suitable to be satisfied with the available natural air which has a small drying power, it is true, but which prevents an increase of temperature in the fodder and consequently its rapid decomposition.

In the cited example the volume of air has been 30 cubic meters per second when using natural air. For the purpose of increasing the temperature of the air to 35 to 45 degrees centigrade a furnace was used capable of giving off 300,000 kilogram-calories per hour to the air. The drying was then effected with the aid of only ⅓ of said volume of air or 10 cubic meters per second, the temperature then rising from 15 to 35 to 45 degrees centigrade. The drying capacity of the heated air remained about the same as for the natural air used during the day, or 330 kilograms of water per hour, corresponding to a production in 24 hours of 2,000 kilograms of dried hay having a water content of 18 per cent, or 8,000 kilograms of wet material.

In the example given each part of the material to be dried will thus remain in the drying apparatus for 3 to 4 days. It should be noted, however, that the drying to a water content of 40 per cent has taken place in a considerably shorter time, viz. in one or two days.

The lowest air velocity that can be used in practice is about 5 meters per minute. One can, of course, also use very great volumes of air, but as at high air velocities the drying capacity of the air is not economically utilized and as in practice a high working pressure will be required for the air a velocity of 100 meters per minute counted on the gross sectional area through the material cannot readily be exceeded.

I claim:

1. A method of drying moist vegetable material of the kind showing a marked coherency between the vegetable parts, such as grass and herbs, particularly in a living state, comprising forming said material into a plurality of individually coherent strings, passing said strings individually in generally parallel but zig-zag paths so that proximate strings are alternately adjacent then substantially separated thereby forming cells between the individual strings for the passage of drying medium and passing a drying medium through the material.

2. A method of drying moist vegetable material showing a marked coherency between the individual vegetable parts, for example grass and the like, which comprises introducing the vegetable material into the top of a column so as to form individually coherent strings, moving the material downwardly through the column as individually coherent and separate strings between guide members to form air cells, and passing drying air through the column in a path from air cell to air cell and accordingly transversely through the coherent strings.

3. A method of drying moist vegetable material of the kind showing a marked coherency between the vegetable parts, such as grass and herbs, particularly in a living state, comprising forming said material into a plurality of individually coherent strings, passing proximate strings individually in paths that successively diverge then converge to produce cells rectangular in cross section between said proximate individual strings for the passage of a drying medium and passing a drying medium through the material.

4. A method of drying moist vegetable material showing a marked coherency between the individual vegetable parts, for example grass and the like, which comprises introducing the vegetable material into the top of a column so as to form individually coherent strings, moving the material downwardly through the column as individually coherent strings which are successively guided toward, then away from, an adjacent string forming air cells in the latter case, and passing drying air through the column in a path from air cell to air cell and accordingly transversely through the coherent strings.

5. A method of drying moist vegetable material of the kind showing a marked coherency between the vegetable parts, such as grass and herbs, particularly in a living state, comprising forming said material into a plurality of individually coherent strings, maintaining said material in the individual coherent strings throughout the drying operation, passing proximate strings individually downwardly in paths that successively diverge then converge to produce cells rectangular in cross section between said proximate individual strings for the passage of a drying medium, and subjecting the individually coherent strings to a braking action near the end of their confined paths to control the rate of passage of the material.

6. The method of drying moist vegetable material showing a marked coherency between the individual vegetable parts, for example, grass and the like, which comprises intermittently introducing the vegetable material into the top of a column so as to form individually coherent strings, moving the material downwardly through the column as individually coherent strings between guide members to form air cells, passing drying air generally upwardly through the column in a path from air cell to air cell and accordingly transversely through the coherent strings and passing air of lower relative humidity through the column after each addition of fresh moist material to the top of the column and intermittently discharging the individual strings of dried vegetable material.

7. A method of drying moist vegetable material showing a marked coherency between the individual vegetable parts, for example grass and the like, which comprises introducing the vegetable material into the top of a column so as to form individually coherent strings, moving the material downwardly through the column as individually coherent and separate strings which are successively guided toward, then away from, an adjacent string forming air cells in the latter case, passing drying air generally upwardly through the column in a path from air cell to air cell and accordingly transversely through the coherent strings and adding additional air of lower relative humidity to the air cells at the upper portion of the column where the fresh material is introduced.

8. An arrangement for drying moist vegetable material showing a marked coherency between the vegetable parts, such as grass and herbs, particularly in a living state, comprising in combination a drying room, a plurality of horizontal beams extending across said drying room, a plurality of downwardly sloping pegs secured to each of said beams substantially perpendicularly to the longitudinal axis thereof, said beams with their appertaining sloping pegs being so arranged as to form sliding paths for coherent strings of vegetable material, and means for passing drying air through the drying room occupied by said strings of vegetable material.

9. An arrangement according to claim 8, characterized in that the pegs situated nearest to the ends of the beams have a steeper slope than the others in order to force the vegetable material against the wall of the drying room and prevent air from flowing between the material and the wall.

10. An arrangement for drying moist vegetable material showing a marked coherency between the vegetable parts such as grass and herbs, particularly in a living state, and very moist seed, comprising in combination a drying room, a plurality of tiers of beams extending across said drying room and providing sloping paths for coherent strings of sliding vegetable material, and a floor at the level of the uppermost tier of beams provided with openings to form guiding edges for each feeding path to facilitate the initial forming of the material into coherent strings.

11. An arrangement for drying moist vegetable material showing a marked coherency between the vegetable parts, such as grass and herbs, particularly in a living state, comprising in combination a drying room, a plurality of beams extending across said drying room, said beams being arranged in a plurality of tiers, the beams of one tier being above the space between the beams in the next lower tier, a plurality of downwardly sloping pegs secured to each of said beams substantially perpendicular to the longitudinal axis thereof, said beams with their appertaining pegs forming separate sloping zigzag paths for the coherent strings of vegetable material, and means for passing drying air through the drying room occupied by said strings of vegetable material.

12. An arrangement for drying moist vegetable material showing a marked coherency between the vegetable parts, such as grass and herbs, particularly in a living state, and comprising in combination a drying room, a plurality of beams extending across said drying room, said beams being arranged in a plurality of tiers, the beams of one tier being above the space between the beams in the next lower tier, a plurality of downwardly sloping pegs secured to each of said beams substantially perpendicular to the longitudinal axis thereof, said beams with their appertaining pegs forming sloping zigzag paths for the coherent strings of vegetable material, means normally preventing passage of the coherent strings from between the lowermost beams which may be actuated to advance the coherent strings, and means for passing drying air through the drying room occupied by said strings of vegetable material.

13. An arrangement for drying moist vegetable material showing a marked coherency between the vegetable parts, such as grass and herbs, particularly in a living state, comprising in combination a drying room, a plurality of beams extending across said drying room, said beams being arranged in a plurality of tiers, the beams of one tier being above the space between the beams in the next lower tier, each beam in cross section forming an inverted Y with pegs projecting from the downwardly extending bifurcations to form air cells and paths for the material while the upwardly extending stem of the inverted Y prevents contact between the material in proximate paths.

14. An arrangement for drying moist vegetable material showing a marked coherency between the vegetable parts, such as grass and herbs, particularly in a living state, comprising in combination a drying room, a plurality of horizontal beams extending across said drying room, a plurality of downwardly sloping pegs secured to each of said beams substantially perpendicularly to the longitudinal axis thereof, said beams with their appertaining sloping pegs being so arranged as to form sliding paths for coherent strings of vegetable material, a dividing wall extending upwardly from the lower tiers of beams to prevent contact between the material in proximate paths and means for passing drying air through the drying room occupied by said strings of vegetable material.

HARALD EDHOLM.